United States Patent
Tan et al.

(10) Patent No.: US 11,026,294 B2
(45) Date of Patent: Jun. 1, 2021

(54) METHOD OF TWO-WAY MULTIPLE-HOP WIRELESS RELAY BASED ON NETWORK CODING

(71) Applicant: University of Electronic Science and Technology of China, Chengdu (CN)

(72) Inventors: Xuesong Tan, Chengdu (CN); Wenbo Gao, Chengdu (CN)

(73) Assignee: UNIVERSITY OF ELECTRONIC SCIENCE AND TECHNOLOGY OF CHINA, Chengdu (CN)

(*) Notice: Subject to any disclaimer, the term of this patent is extended or adjusted under 35 U.S.C. 154(b) by 0 days.

(21) Appl. No.: 16/809,573

(22) Filed: Mar. 5, 2020

(65) Prior Publication Data
US 2020/0296792 A1   Sep. 17, 2020

(30) Foreign Application Priority Data
Mar. 14, 2019   (CN) .......................... 201910191513.8

(51) Int. Cl.
| | |
|---|---|
| *H04W 84/18* | (2009.01) |
| *H04L 12/26* | (2006.01) |
| *H04L 1/00* | (2006.01) |
| *H04L 12/707* | (2013.01) |
| *H04L 12/66* | (2006.01) |
| *H04W 88/04* | (2009.01) |

(52) U.S. Cl.
CPC ........... *H04W 84/18* (2013.01); *H04L 1/0076* (2013.01); *H04L 12/66* (2013.01); *H04L 43/0852* (2013.01); *H04L 45/22* (2013.01); *H04W 88/04* (2013.01)

(58) Field of Classification Search
CPC .. H04W 84/18; H04W 88/04; H04L 43/0852; H04L 1/0076; H04L 45/22; H04L 12/66
See application file for complete search history.

(56) References Cited

U.S. PATENT DOCUMENTS

| | | | | |
|---|---|---|---|---|
| 9,160,687 | B2* | 10/2015 | Haeupler | .............. H04L 1/0057 |
| 9,537,759 | B2* | 1/2017 | Calmon | .................. H04L 69/14 |

OTHER PUBLICATIONS

Sang Joon Kim, et al., A class of Bi-directional multi-relay protocols, ISIT 2009, Jun. 28-Jul. 3, 2009, pp. 349-353, Seoul, Korea.
(Continued)

*Primary Examiner* — Jianye Wu
(74) *Attorney, Agent, or Firm* — Bayramoglu Law Offices LLC (57) ABSTRACT

A two-way wireless relay transmission method based on network coding is provided, wherein two end nodes and n relay nodes (wherein n≥2) which form a two-way wireless relay (TWRN) are divided into three different categories, so that any two nodes in a same category are separated by at least two relay nodes belonging to other different categories, and in a same timeslot, only nodes belonging to one category are allowed to transmit data packets and nodes of the other two categories should keep silent. As a result, the mutual interference caused by the simultaneous transmission of data packets between adjacent nodes is effectively avoided, and the mutual interference caused by the simultaneous transmission of data packets by the nodes belonging to a same category is reduced.

2 Claims, 8 Drawing Sheets

(56) References Cited

OTHER PUBLICATIONS

Qimin You, et al., A Multihop Transmission Scheme With Detect-and-Forward Protocol and Network Coding in Two-Way Relay Fading Channels, IEEE Transactions on Vehicular Technology, Jan. 2012, pp. 433-438, vol. 61, No. 1.

Petar Popovski, et al., Bi-directional Amplification of Throughput in a Wireless Multi-Hop Network, IEEE, 2006, pp. 588-593.

Qiang Huo, Novel Multihop Transmission Schemes Using Selective Network Coding and Differential Modulation for Two-Way Relay Networks, IEEE ICC Wireless Communications Symposium, 2013, pp. 5924-5928.

* cited by examiner

METHOD OF TWO-WAY MULTIPLE-HOP WIRELESS RELAY BASED ON NETWORK CODING

CROSS REFERENCE TO THE RELATED APPLICATIONS

This application is based upon and claims priority to Chinese Patent Application No. 201910191513.8, filed on Mar. 14, 2019, the entire contents of which are incorporated herein by reference.

TECHNICAL FIELD

The invention belongs to the technical field of wireless communication and in particular relates to a two-way wireless relay transmission mechanism based on network coding.

BACKGROUND

In a two-way communication channel with peer-to-peer communication as a typical example, two end nodes need to exchange their messages of mutual interest. For a wireless channel or wireless mesh network with limited communication range, when the spatial distance between the two end nodes is too long, the aforementioned two-way communication process has to rely on multiple relays to forward their data packets sequentially. These end and relay nodes together form a two-way wireless relaying network (TWRN).

Existing research has shown that, when a TWRN is applied with the network coding (NC) technology, it will obtain an overall transmission performance superior to the TWRN based on the traditional store-and-forward (SF) technology. For example, for a single-relay TWRN of two hops, the technology of analog NC (ANC) based on the amplify-and-forward (AF) method enables its two end users to exchange one pair of data packets every two timeslots, while that of digital NC (DNC) based on the decode-and-forward (DF) method allows them to exchange the same number of data packets every three timeslots. In contrast, the traditional technology based on the SF method needs at least four timeslots to complete the same exchange of two data packets. Therefore, compared with the traditional SF technology, the AF-based ANC technology and the DF-based DNC technology, respectively, can provide about 50% or 33.33% theoretical gain of transmission throughput for a single-relay TWRN.

Among them, because the AF method may amplify transmission errors in one wireless channel, and the ANC technology requires each node to perform self-information cancellation and estimate channel state information (CSI) accurately, the implementation of the AF-based ANC technology incurs fairly large software and hardware cost and its practical transmission performance, including bit error rate (BER) and throughput, may be far away from the theoretical optimum. On the other hand, the DF-based DNC technology can effectively overcome the shortcomings of the AF-based ANC technology and hence has high practical value.

In the existing research, "Bi-directional amplification of throughput in a wireless multi-hop network" has designed a DF-based DNC scheme for the two end nodes in a 2-relay 3-hop TWRN to exchange one pair of data packets every 3 timeslots. However, for a TWRN with an arbitrary number of n relays, where n≥3, none of the existing DF-based DNC technology can achieve a comparable performance of exchanging two data packets every 3 timeslots. For example, "A class of Bi-directional multi-relay protocols" proposes a DNC scheme for the two end nodes in an n-relay TWRN with n≥3 to exchange one pair of data packets every n+2 slots. Meanwhile, "A Multihop Transmission Scheme With Detect-and-Forward Protocol and Network Coding in Two-Way Relay Fading Channels" designs another DNC scheme for a TWRN with at least 5 relays to exchange a same number of data packets every 5 timeslots. Moreover, "Novel Multihop Transmission Schemes Using Selective Network Coding and Differential Modulation for Two-Way Relay Networks" proposes for the two end nodes in a TWRN to exchange two data packets every 4 timeslots.

Besides this, none of the existing DF-based DNC schemes has designed an appropriate error control mechanism for correcting the transmission errors occurred in each wireless channel due to channel fading, which will be gradually propagated throughout the whole TWRN and make the DNC-based two-way transmission scheme operate incorrectly. Therefore, whether there exists a DF-based DNC scheme that can further improve the transmission performance of a TWRN with an arbitrary number of relays and how to design an appropriate error control mechanism for this scheme are two unsolved problems up to now.

SUMMARY

The purpose of this invention is to solve the shortcomings of the existing DF-based DNC schemes for a TWRN with an arbitrary number of relays, that is, they cannot maximize the theoretically optimal transmission performance and lack of an appropriate error control mechanism for correcting transmission errors. This invention proposes a DF-based DNC scheme for a TWRN with an arbitrary number of $n(\geq 2)$ relays. On the one hand, the proposed scheme can effectively improve the overall transmission performance for a TWRN by reducing the number of timeslots required for its two end nodes to exchange one pair of data packets once. On the other hand, by retransmitting erroneous data packets in an appropriate way and applying DNC-based suitable control to each node, this scheme can effectively avoid the propagation of the transmission errors occurred in each wireless channel from affecting the correct operation of the whole TWRN.

Figure 1:
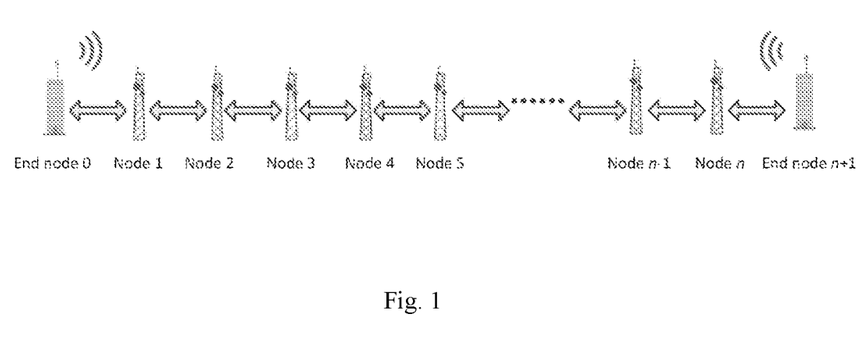
FIG. 1 depicts the schematic diagram of a generic two-way wireless relay network (TWRN) consisting of two end nodes labeled by 0 and n+1 and n relays labeled by 1, 2, ..., n, where n≥2.

For a TWRN composed of two end nodes and an arbitrary number of n relays, where n≥2, as shown in FIG. 1, this invention designs the following two-way transmission scheme based on the DF-based DNC technology:

Step 1. Label the two end nodes in the TWRN by 0 and n+1 and the n relay nodes by 1, 2, ..., n such that, for any $i \in [0, n]$, the nodes i and i+1 are always neighboring with each other.

Step 2. Deploy one receiving buffer (RB) at each relay, i.e., the node $i \in [1, n]$, in the TWRN for buffering those data packets that for buffering those data packets that are successfully received from its neighbors and those XOR results for ensuing transmission. Meanwhile, deploy an RB at each end node, i.e., the node 0 or n+1, for buffering those data packets that are either successfully received from its neighbor or generated by itself, and a coding buffer (CB) for buffering a unique XOR result of multiple data packets, which will be transmitted by this end node in the sequel. Among them, the said CB should be initialized as empty.

Step 3. Starting from timeslot 0, each node in the TWRN should transmit the data packets generated by the nodes 0 and n+1 according to the following rules:

Step 3.1. Each node $i \in [0, n+1]$ can transmit a data packet to its neighbors only in the timeslots $3t+(i \bmod 3)$, where t is a non-negative number. When a relay, i.e., the node i∈[1, n], obtains a transmission opportunity, if its RB is not empty, then it will transmit the first data packet buffered in its RB to both nodes i−1 and i+1; else, it will remain silent. When an end node, i.e., the node 0 or n+1, obtains a transmission opportunity, if its CB is not empty, then it will transmit the unique data packet buffered in its CB to the node 1 or n, respectively; else, if its RB is not empty, it will transmit the first data packet buffered in its RB to the node 1 or n, respectively; else, it will remain silent.

Step 3.2. Whenever the node i∈[0, n+1] successfully receives a data packet destined to it, if it is in the process of repeatedly transmitting a data packet described in Step 4.1 or in the process of repeatedly receiving a data packet described in Step 4.2, it will operate according to Step 4.1 or 4.2; else, if its RB is empty, then it will update its RB with the received data packet directly; else, it will first XOR the received data packet with the first data packet buffered in its RB. After this XOR operation, a relay, i.e., the node i∈[1, n], will update the first data packet buffered in its RB with the XOR result, while an end node, i.e., the node 0 or n+1, will execute the following three operations sequentially:

Step 3.2.1. If not all bits in this XOR result are 0, then the XOR result will be sent to its upper-layer protocol for further process; else, it will remain silent.

Step 3.2.2. Pop the first buffering packet out from its RB so that the $k^{th}$ packet, where k≥2, buffered in its RB will become the $(k-1)^{st}$ buffering one.

Step 3.2.3. If the updated RB is not empty, it will apply the XOR operation to the XOR result and the first packet buffered in its updated RB and then update its CB with this final XOR result; else, it will update its CB with the first XOR result directly.

Step 4. To avoid the propagation of transmission errors occurred in each wireless channel from affecting the correct operation of two-way transmission, each node i∈[0, n+1] in the TWRN should adopt the following two rules for correcting transmission errors:

Step 4.1. For each non-negative integer t, if the node i fails to transmit a data packet to its neighbors, which can be the node i−1, i+1, or both nodes i−1 and i+1, then it will retransmit the same data packet to the same destination node in the timeslot 3(t+1)+(i modulo 3), 3(t+2)+(i modulo 3), ..., until the aforementioned data packet is successfully received by its desired destination node. Meanwhile, in the time period from the timeslot 3t+(i modulo 3)+1 to the timeslot when the node i successfully transmits the aforementioned data packet to its desired destination node, it will buffer the data packet successfully received from another neighbor node as the second data packet in its RB immediately but will not XOR this data packet with the first data packet buffered in its RB. On the other hand, after transmitting the aforementioned data packet successfully to its desired destination node, the node i will update the first packet buffered in its RB with the XOR result of two data packets buffered in its RB and delete the second data packet buffered in its RB.

Step 4.2. For each t≥0, given that the node i has transmitted a data packet successfully to its neighbor, i.e., the node i−1 (resp. i+1), in the timeslot 3t+(i modulo 3) but does not receive any data packet from the latter in the timeslot 3t+(j modulo 3)+2 (resp. 3t+(j modulo 3)+1), then the node i will try to receive the data packet transmitted by the node i−1 (resp. i+1) in the timeslots 3(t+1)+(i modulo 3)+2 (resp. 3(t+1)+(i modulo 3)+1), 3(t+2)+(i modulo 3)+2 (resp. 3(t+2)+(i modulo 3)+1), ..., until the node i receives a data packet successfully from the node i−1 (resp. i+1). At the same time, in the time period from the timeslot 3(t+1)+(i modulo 3) (resp. 3t+(i modulo 3)+2) to the timeslot when the node i successfully receives a data packet transmitted by the node i−1 (resp. node i+1), the node i will XOR the data packet transmitted by another neighbor node, i.e., the node i+1 (resp. node i−1), with the first data packet buffered in its RB and update the first data packet in its RB with this XOR result but will stop transmitting any packets temporarily.

The advantages of this invention are described as follows:

This invention divides the two end nodes and n relays in an n-relay TWRN into three different categories such that any two nodes in the same category are separated by at least two relays belonging to different categories and, in each timeslot, only all nodes belonging to one category are allowed to transmit data packets and those of the other two categories should keep silent. This effectively avoids the mutual interference caused by simultaneous transmission of data packets between adjacent nodes and reduces that caused by the concurrent transmission of data packets by the nodes belonging to a common category. Moreover, based on the DF-based DNC technology, this invention supports the two end nodes in an n-relay TWRN, where n can be an arbitrary number not smaller than 2, to exchange one pair of data packets every 3 timeslots.

In contrast, for a TWRN consisting of two end nodes and an arbitrary number of n relays, where n≥2, a traditional SF scheme can only support the two end nodes to exchange one pair of data packets every 5 timeslots, Thus, compared with the traditional SF technology, the DF-based DNC scheme proposed by the present invention can provide about 66.67% theoretical gain of two-ways transmission throughput for a TWRN with an arbitrary number of n relays.

Finally, compared with the existing DF-based DNC schemes, the present invention can not only provide a TWRN with an arbitrary number of n relays with a better theoretical overall transmission performance but also effectively prevent the transmission errors occurred in each wireless channel from being propagated throughout the whole TWRN and hence guarantee the correct operation of the TWRN.

BRIEF DESCRIPTION OF THE DRAWINGS

FIG. 2 depicts the two-way transmission process of a 3-relay TWRN under the DF-based DNC scheme proposed by this invention. In this illustration, at the beginning of each timeslot, the data packet buffered in the RB of each node i∈[1, 3] is depicted in a single box over this node and that buffered in the CB or RB of the nodes 0 and 4 in the left or right box over it, respectively. Each symbol 0 in this figure represents a data packet with all bits being 0 and each dashed double arrow means the abandon of one transmission opportunity by a node. In addition, in each box representing an RB, the left and right letters represent the first and second data packets buffed in the RB, respectively.

FIG. 3 depicts an exemplified error correction process over a 3-relay TWRN under the DF-based DNC scheme proposed by this invention. In this illustration, at the beginning of each timeslot, the data packet buffered in the RB of each node i∈[1, 3] is depicted in a single box over this node and that buffered in the CB or RB of the nodes 0 and 4 in the left or right box over it, respectively. Each symbol 0 in this figure represents a data packet with all bits being 0 and each dashed double arrow means the abandon of one transmission opportunity by a node. In addition, in each box representing an RB, the left and right letters represent the first and second data packets buffed in the RB, respectively.

FIG. 4 depicts the two-way transmission process of a 3-relay TWRN under a store-and-forward (SF) scheme. In this illustration, at the beginning of each timeslot, the left (resp. right) box over the node $i \in [1, 3]$, respectively, represents the data packet that it has received from the node i+1 (resp. i−1) and will transmit to node i−1 (resp. i+1) in the sequel, while that over the node 0 (resp. 4) represent the data packet that it has generated and will transmit in the sequel. Each dashed double arrow means the abandon of one transmission opportunity by a node.

DETAILED DESCRIPTION OF THE EMBODIMENTS

Below we shall give a detailed example for explaining the technical part of this invention.

For the convenience of analysis, we assume that the length of the data packets transmitted by the two end nodes, i.e. the nodes 0 and n+1, of a TWRN is fixed as 8472 bits and the transmission rate of the wireless channel between any two adjacent nodes in the TWRN as 11 Mbit/s.

FIG. 1 depicts the schematic diagram of a generic two-way wireless relay network (TWRN) consisting of two end nodes and n relays, where n≥2. In particular, when n=3, the present invention designs the following two-way transmission scheme for a 3-relay TWRN based on the DF-based DNC technology:

Step 1. Label the two end nodes in the TWRN by 0 and 4 and the 3 relay nodes by 1, 2, and 3 such that, for any $i \in [0, 3]$, the nodes i and i+1 are always neighboring with each other.

Step 2. Deploy one receiving buffer (RB) at each relay, i.e., the node $i \in [1, 3]$, in the TWRN for buffering those data packets that are successfully received from its neighbors and those XOR results for ensuing transmission. Meanwhile, deploy an RB at each end node, i.e., the node 0 or n+1, for buffering those data packets that are either successfully received from its neighbor or generated by itself, and a coding buffer (CB) for buffering a unique XOR result of multiple data packets, which will be transmitted by this end node in the sequel. Among them, the said CB should be initialized as empty.

Step 3. Starting from timeslot 0, each node in the TWRN should transmit the data packets generated by the nodes 0 and 4 according to the following rules:

Step 3.1. Divides the 5 nodes in the TWRN, i.e., the nodes 0, 1, 2, 3, and 4, into three categories. Among them, the nodes 0 and 3 belonging to the first category can only transmit data packets in the timeslots 0, 3, 6, . . . , the nodes 1 and 4 belonging to the second category can only transmit data packets in the timeslots 1, 4, 7, . . . , and the node 2 belonging to the third category can only transmit data packets in the timeslots 2, 5, 8, . . . . When a relay, i.e., the node $i \in [1, 3]$, obtains a transmission opportunity, if its RB is not empty, then it will transmit the first data packet buffered in its RB to both nodes i−1 and i+1; else, it will remain silent. When an end node, i.e., the node 0 or 4, obtains a transmission opportunity, if its CB is not empty, then it will transmit the unique data packet buffered in its CB; else, if its RB is not empty, it will transmit the first data packet buffered in its RB; else, it will remain silent.

Step 3.2. Whenever the node $i \in [0, 4]$ successfully receives a data packet destined to it, if it is in the process of repeatedly transmitting a data packet described in Step 4.1 or in the process of repeatedly receiving a data packet described in Step 4.2, it will operate according to Step 4.1 or 4.2; else, if its RB is empty, then it will update its RB with the received data packet directly; else, it will first XOR the received data packet with the first data packet buffered in its RB. After this XOR operation, a relay, i.e., the node $i \in [1, 3]$, will update the first data packet buffered in its RB with the XOR result, while an end node, i.e., the node 0 or 4, will execute the following three operations sequentially:

Step 3.2.1. If not all bits in this XOR result are 0, then the XOR result will be sent to its upper-layer protocol for further process; else, it will remain silent.

Figure 2:
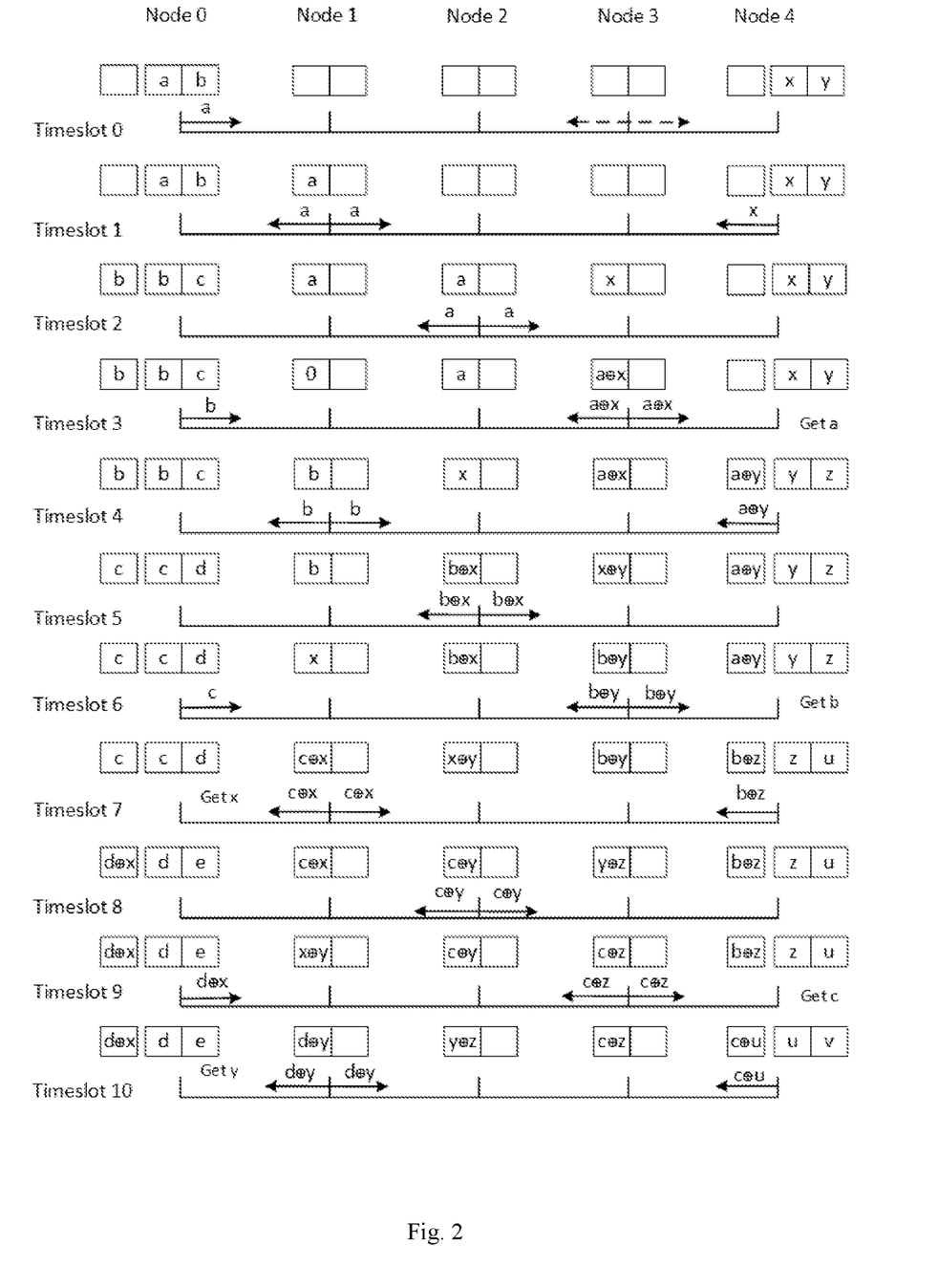

For example, as shown in FIG. 2, in the timeslot 1 (resp. 4), since the XOR result of the data packet a (resp. b) received by the node 0 and the first data packet a (resp. b) buffered in its RB is a data packet with all bits being 0, the node 0 will not send this XOR result to its upper-layer protocol for further process. On the other hand, in the timeslot 7, the node 0 XORs the received data packet c⊕x with the first data packet c buffered in its RB and sends the XOR result, i.e., x, to its upper-layer protocol for further process. Similarly, in the timeslot 3 (resp. 6), the node 4 XORs the received data packet a⊕x (resp. b⊕y) with the first data packet x (resp. y) buffered in its RB and sends the XOR result, i.e., a (resp. b), to its upper-layer protocol for further process.

Step 3.2.2. Pop the first buffering packet out from its RB so that the $2^{nd}$, $3^{rd}$, . . . data packets, if any, buffered in its RB become its $1^{st}$, $2^{nd}$, . . . data packets, respectively.

For example, as shown in FIG. 2, in the timeslot 4 (resp. 7), after receiving the data packet b (resp. c⊕x) successfully from the node 1 and XORing this received packet with the first data packet b (resp. c⊕x) buffered in its RB, the node 0 will pop the first packet b (resp. c) out from its RB such that the second packet c (resp. d) buffered in its RB will become the first one buffered in the updated RB.

Step 3.2.3. If the updated RB is not empty, it will apply the XOR operation to the XOR result and the first packet buffered in its updated RB and then update its CB with this final XOR result; else, it will update its CB with the first XOR result directly.

For example, as shown in FIG. 2, at the end of the timeslot 7, the node 0 will first send the XOR result x to its upper-layer protocol , then pop the packet c out from its RB such that the packet d will become the first packet buffered in its RB, and finally update its CB with the final XOR result of the XOR result x sent to its upper-layer protocol and the first data packet d buffered in its RB, which is d⊕x.

Similarly, at the end of timeslot 3 (resp. timeslot 6), the node 4 will send the XOR result of a (resp. b) to its upper-layer protocol and update its CB with the final XOR result of this XOR result a (resp. b) and the first data packet y (resp. z) buffered in its RB, which is a⊕y (resp. b⊕z).

Figure 3:
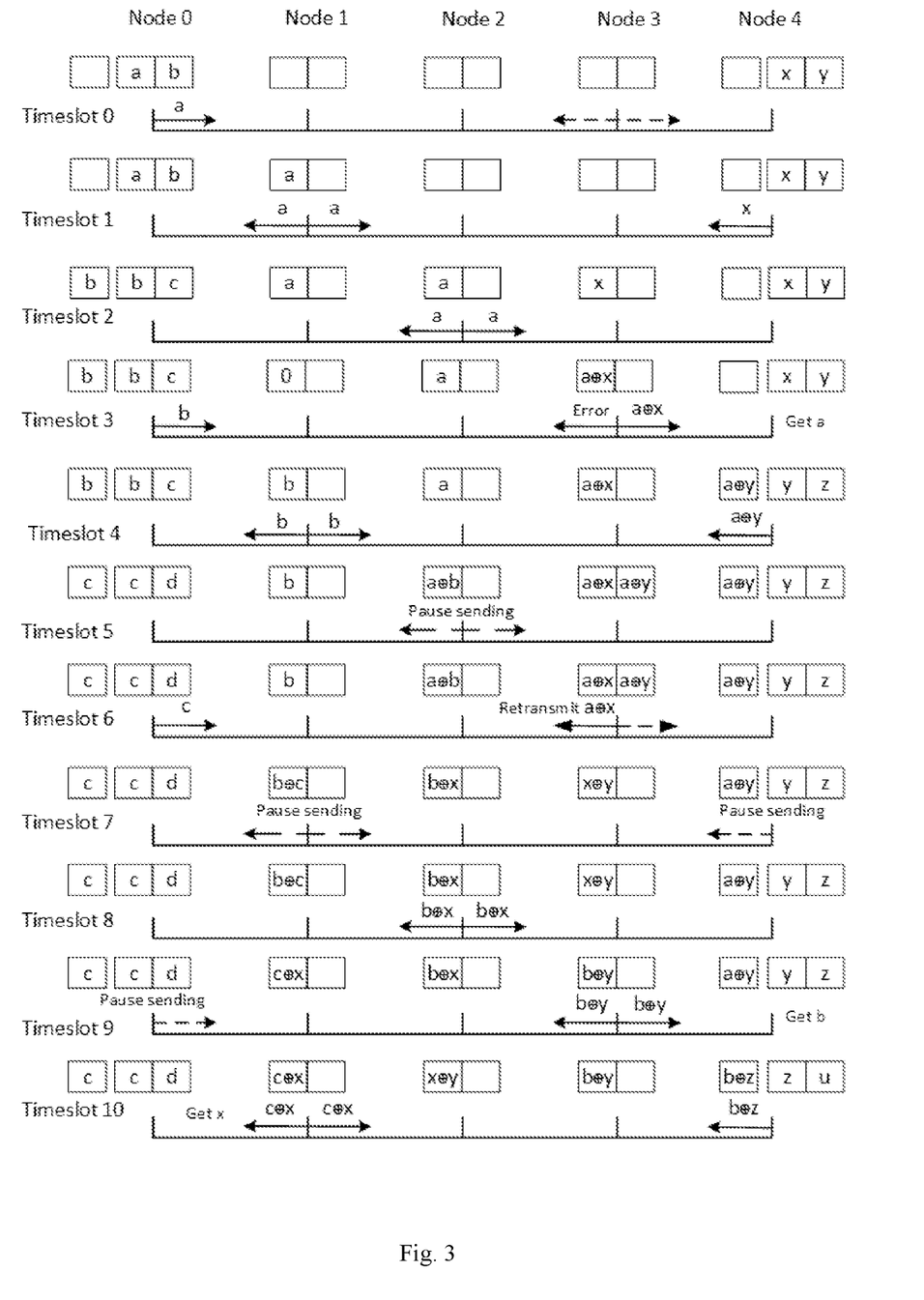

Step 4. As shown in FIG. 3, to avoid the propagation of transmission errors occurred in each wireless channel from affecting the correct operation of two-way transmission, each node i∈[0, 4] in the TWRN should adopt the following two rules for correcting transmission errors:

Step 4.1. For each non-negative integer t, if the node i fails to transmit a data packet to its neighbors, which can be the node i−1, i+1, or both nodes i−1 and i+1, then it will retransmit the same data packet to the same destination node in the timeslot $3(t+1)+(i\ modulo\ 3)$, $3(t+2)+(i\ modulo\ 3)$, ..., until the aforementioned data packet is successfully received by its desired destination node. For example, as shown in FIG. 3, since the node 3 fails to transmit the data packet a⊕x to the node 2 in the timeslot 3, it will continue to retransmit the same data packet a⊕x to the node 2 in the timeslot 6, 9, ... until the packet a⊕x is successfully received by the node 2 in the timeslot 6.

Meanwhile, during the time period from the timeslot $3t+(i\ modulo\ 3)+1$ to the timeslot when the node i successfully transmits the aforementioned data packet to its desired destination node, it will buffer the data packet successfully received from another neighbor node as the second data packet in its RB immediately but will not XOR this data packet with the first data packet buffered in its RB. For example, as shown in FIG. 3, in the time period from the timeslot 4 to the timeslot 6 when the node 3 successfully transmits a packet a⊕x to the node 2, the node 3 will buffer the packet a⊕y transmitted by another neighbor node, i.e., the node 4, in the timeslot 4 as the second data packet buffered in its RB but will not XOR this data packet a⊕y with the first data packet a⊕x buffered in its RB.

On the other hand, after transmitting the aforementioned data packet successfully to its desired destination node, the node i will further update the first packet buffered in its RB with the XOR result of two data packets buffered in its RB and delete the second data packet buffered in its RB. For example, as shown in FIG. 3, in the time period from the timeslot 4 to the timeslot 6 when the node 3 successfully transmits a packet a⊕x to the node 2, the node 3 will update its first packet in its RB with the XOR result of the data packets a⊕x and a⊕y buffered in its RB, which is x⊕y, and delete the second data packet a⊕y buffered in its RB.

Step 4.2. For each t≥0, given that the node i has transmitted a data packet successfully to its neighbor, i.e., the node i−1 (resp. i+1), in the timeslot $3t+(i\ modulo\ 3)$ but does not receive any data packet from the latter in the timeslot $3t+(j\ modulo\ 3)+2$ (resp. $3t+(j\ modulo\ 3)+1$), then the node i will try to receive the data packet transmitted by the node i−1 (resp. i+1) in the timeslots $3(t+1)+(i\ modulo\ 3)+2$ (resp. $3(t+1)+(i\ modulo\ 3)+1$), $3(t+2)+(i\ modulo\ 3)+2$ (resp. $3(t+2)+(i\ modulo\ 3)+1$), ..., until the node i receives a data packet successfully from the node i−1 (resp. i+1). For example, as shown in FIG. 3, as the node 2 has transmitted the packet a successfully to the node 3 in the timeslot 2 but does not receive any data packet from the node 3 in the timeslot 3, it will try to receive the data packet transmitted by the node 3 in the timeslot 6, 9, ... until it receives the packet a⊕x from the node 3 in the timeslot 6.

At the same time, in the time period from the timeslot $3(t+1)+(i\ modulo\ 3)$ (resp. $3t+(i\ modulo\ 3)+2$) to the timeslot when the node i successfully receives a data packet transmitted by the node i−1 (resp. node i+1), the node i will XOR the data packet transmitted by another neighbor node, i.e., the node i+1 (resp. node i−1), with the first data packet buffered in its RB and update the first data packet in its RB with this XOR result but will stop transmitting any packets temporarily. For example, as shown in FIG. 3, in the time period from the timeslot 4 to the timeslot 6 when the node 2 successfully receives the data packet a ex transmitted by the node 3, the node 2 will XOR the data packet b transmitted by the node 1 in the timeslot 4 with the data packet a buffered in its RB and update the first data packet in its RB with the XOR result a⊕b immediately but will stop transmitting any packets temporarily.

As shown by FIG. 2, starting with timeslot 7, a 3-relay TWRN under the DF-based DNC scheme proposed by the present invention can support the two end nodes, i.e., the nodes 0 and 4, to exchange one pair of data packet every 3 timeslots. Meanwhile, as shown by FIG. 3, a 3-relay TWRN under Step 4 of the present invention can effectively prevent each transmission error occurred in one wireless channel from being propagated to the whole TWRN and hence guarantee the correct operation of two-way transmission.

Figure 4:
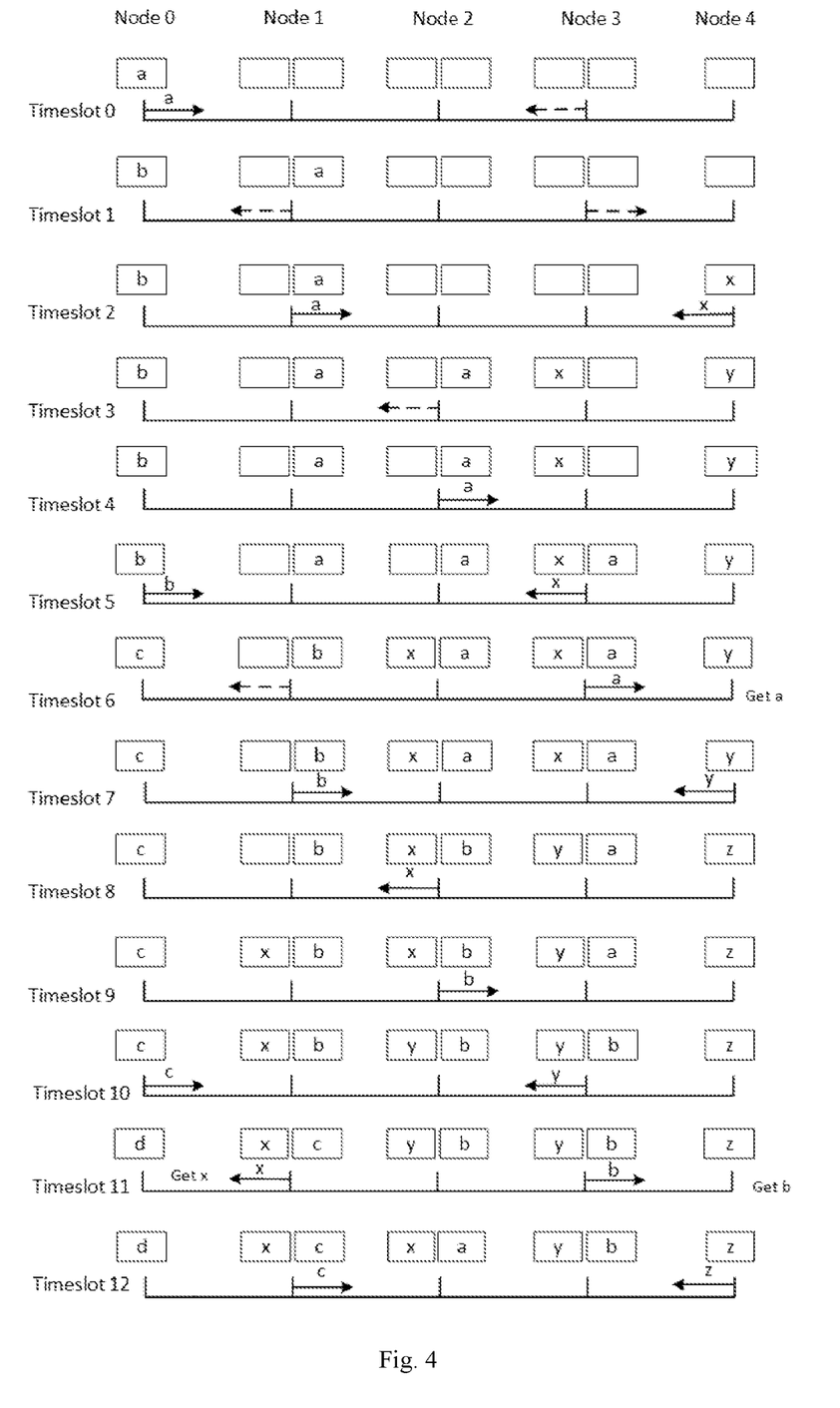
Figure 5:
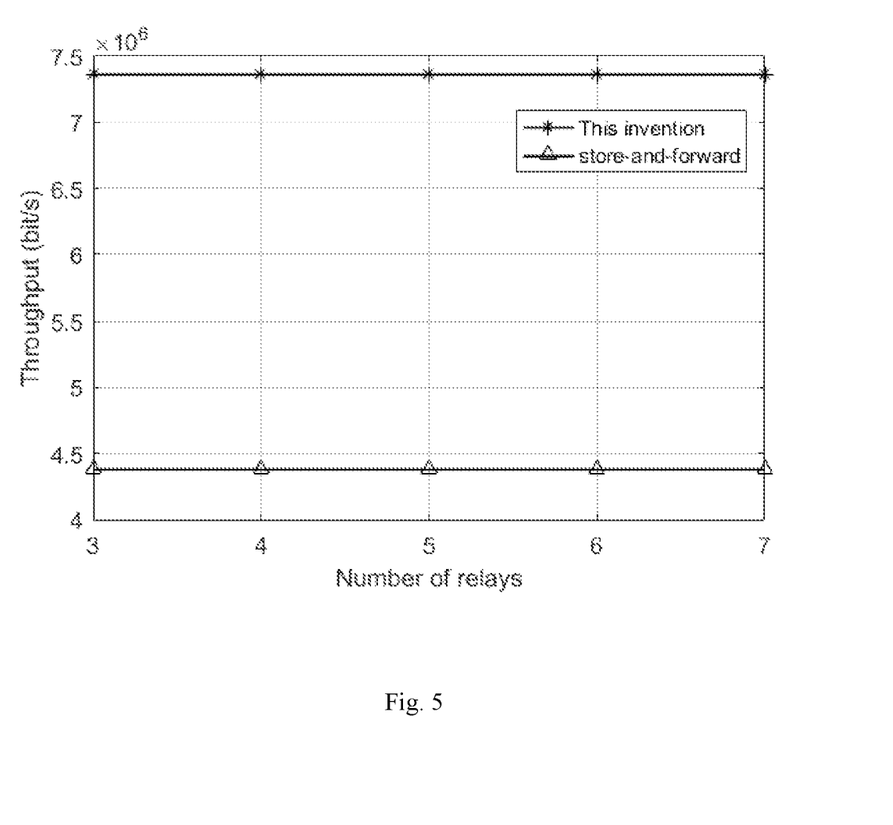
FIG. 5 depicts the overall transmission throughput of an n-relay error-free TWRN in terms of n=3, 4, . . . , 7 under the DF-based DNC scheme proposed by the present invention and the SF scheme illustrated in FIG. 4.

FIG. 4 depicts the two-way transmission process of a 3-relay TWRN under a store-and-forward (SF) scheme in the timeslots 0, 1, ..., 10, which can only exchange two data packets between two end nodes every 5 timeslots, while FIG. 5 depicts the overall transmission throughput of an n-relay TWRN in terms of n=3, 4, ..., 7 under the DF-based DNC scheme proposed by the present invention and the SF scheme illustrated in FIG. 4. It shows that, when the operation of the TWRN reaches a stable state, the proposed DF-based DNC scheme can provide about 66.67% theoretical gain of two-way transmission throughput over the SF scheme shown in FIG. 4.

Figure 6:
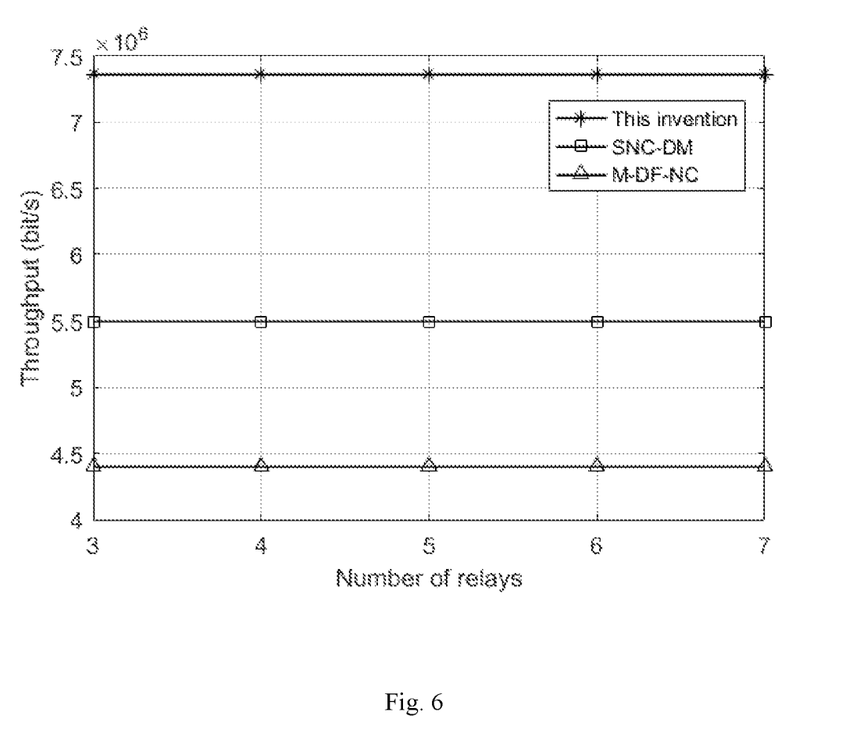
FIG. 6 depicts the overall transmission throughput of an n-relay error-free TWRN in terms of n=3, 4, . . . , 7 under the DF-based DNC scheme proposed by this invention and the two existing DF-based DNC schemes.

FIG. 6 depicts the overall transmission throughput of an n-relay TWRN in terms of n=3, 4, ..., 7 under the DF-based DNC scheme proposed by this invention and the two existing DF-based DNC schemes, namely M-DF-NC and SNC-DM, proposed by "A Multihop Transmission Scheme With Detect-and-Forward Protocol and Network Coding in Two-Way Relay Fading Channels" and "Novel Multihop Transmission Schemes Using Selective Network Coding and Differential Modulation for Two-Way Relay Networks", respectively. It shows that, when the operation of the TWRN reaches a stable state, the proposed DF-based DNC scheme can obtain a significantly higher transmission throughput over the SNC-DM or M-DF-NC scheme.

Figure 7:
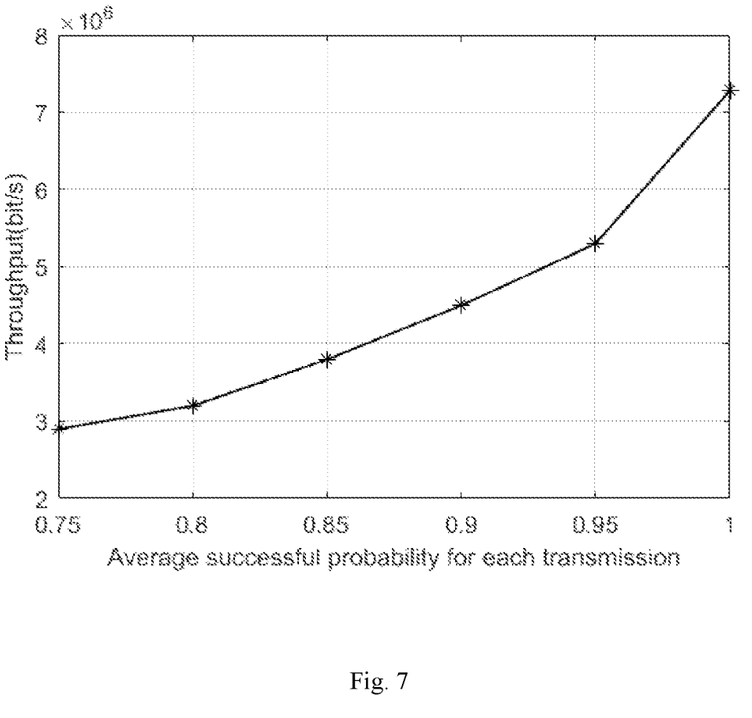
FIG. 7 depicts the simulated effective throughput of a 5-relay erroneous TWRN in terms of the average successful probability of each packet transmission under the DF-based DNC scheme proposed by this invention.
Figure 8:
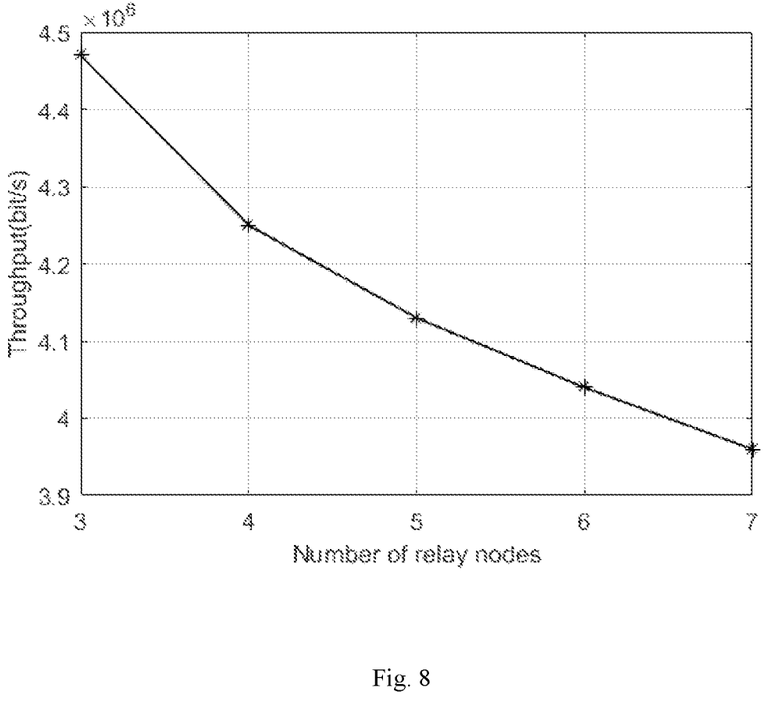
FIG. 8 depicts the simulated effective throughput of a erroneous TWRN in terms of the number of relays in the TWRN under the DF-based DNC scheme proposed by this invention when the average successful probability of each packet transmission is 0.9.

FIG. 7 depicts the simulated effective throughput of a 5-relay TWRN in terms of the average successful probability of each packet transmission under the proposed DF-based DNC scheme, while FIG. 8 depicts the simulated effective throughput of a TWRN in terms of the number of relays in the TWRN under the proposed DF-based DNC scheme when the average successful probability of each packet transmission is 0.9. It shows that the proposed DF-based DNC scheme can effectively prevent each transmission error occurred in one wireless channel of a TWRN from being propagated throughout the whole TWRN and hence guarantee the correct operation of two-way transmission process.

What is claimed is:

1. A method of two-way multiple-hop wireless relay based on network coding, comprising the following steps:
    S1, initialization, in a two-way wireless relay network (TWRN), labeling a first end node by 0, a second end node by n+1, and n relay nodes from the first end node to the second end node by 1, 2, . . . , n, wherein, for an integer i∈[0, n], a node i and a node i+1 are neighboring with each other;

at the node i∈[1, n], deploying a first receiving buffer (RB) for buffering a first plurality of data packets and a first plurality of XOR results for ensuing transmission, wherein the plurality of data packets are successfully received from the node i+1;

at the first end node 0 or the second end node n+1, deploying a second RB for buffering a second plurality of data packets and a coding buffer (CB) for buffering a second plurality of XOR results of the second plurality of data packets, respectively, wherein, the second plurality of data packets are successfully received from a node neighboring the first end node or a node neighboring the second end node, or the second plurality of data packets are generated by the first end node or the second end node, the second plurality of XOR results are to be transmitted by the first end node or the second end node in the sequel, and the CB is initialized as an empty;

S2, starting from a timeslot 0, each node in the TWRN transmits the second plurality of data packets generated by the first end node 0 and the second end node n+1 according to the following rules:

sending rule:

each node i∈[0, n+1] transmits a data packet to a plurality of nodes neighboring to the node only in a timeslot $3t+(i \bmod 3)$, where t is a non-negative number;

when the node i∈[1, n] obtains a transmission opportunity, when the RB of the node i is not empty, the node i transmits a first data packet buffered in the RB to both nodes i−1 and i+1; when the RB of the node i is empty, the node i remains silent;

when the first end node 0 obtains a transmission opportunity, when the CB of the first end node 0 is not empty, the first end node 0 transmits a unique data packet buffered in the CB of the first end node 0 to a node 1; when the CB of the first end node 0 is empty and the RB of the first end node 0 is not empty, the first end node 0 transmits the first data packet buffered in the RB of the first end node 0 to the node 1; when the CB of the first end node 0 is empty and the RB of the first end node 0 is empty, the first end node 0 remains silent;

when the second end node n+1 obtains a transmission opportunity, when the CB of the second end node n+1 is not empty, the second end node n+1 transmits a unique data packet buffered in the CB of the second end node n+1 to a node n; when the CB of the second end node n+1 is empty and the RB of the second end node n+1 is not empty, the second end node n+1 transmits the first data packet buffered in the RB of the second end node n+1 to the node n; when the CB of the second end node n+1 is empty and the RB of the second end node n+1 is empty, the second end node n+1 remains silent;

receiving rule:

whenever the node i∈[0, n+1] successfully receives a data packet destined to the node i, when an RB of the node i is empty, the node i updates the RB of the node i with the data packet destined to the node i; when the RB of the node i is not empty, the node i first performs a XOR operation on the data packet destined to the node i with a first packet buffered in the RB of the node i; after the XOR operation, the node i∈[1, n] updates the first packet in the RB of the node i with a XOR result, while the first end node 0 or the second end node n+1 executes the following operations:

when not all bits in the XOR result are 0, the XOR result is sent to an upper-layer protocol for further process; when all bits in the XOR result are 0, it remains silent;

the first packet is popped out from the RB of the first end node 0 or the second end node n+1, so that a $k^{th}$ packet become a $(k-1)^{th}$ packet, wherein k≥2, and the $k^{th}$ packet is buffered in a corresponding RB; when an updated RB is not empty, the first end node 0 or the second end node n+1 applies the XOR operation to the XOR result and a first packet buffered in the RB of the first end node 0 or the second end node n+1 and then update the CB of the first end node 0 or the second end node n+1 with a final XOR result; when the updated RB is empty, the first end node 0 or the second end node n+1 updates the CB of the first end node 0 or the second end node n+1 with a first XOR result directly.

2. The method of two-way multiple-hop wireless relay based on network coding according to claim 1, wherein, the rules defined in step S2 further comprises:

repeat transmission rule:

for each t≥0, when the node i fails to transmit a data packet to at least one neighboring node of the plurality of nodes neighboring to the node i, wherein the at least one node is the node i−1, the node i+1, or both the nodes i−1 and i+1, then the node i retransmits the data packet to the at least one neighboring node in a timeslot $3(t+1)+(i \bmod 3)$, $3(t+2)+(i \bmod 3)$, . . . , until the aforementioned data packet is successfully received by the at least one neighboring node;

in the time period from the timeslot $3t+(i \bmod 3)+1$ to a timeslot when the node i successfully transmits the data packet to the at least one neighboring node, the node i buffers the data packet successfully received from another neighbor node as a second data packet in the RB of the node i immediately, but not performs the XOR operation on the second data packet with the first data packet buffered in the RB of the node i;

after transmitting the data packet successfully to the at least one neighboring node, the node i updates the first packet buffered in the RB of the the node I with the XOR result of the first data packet and the second data packet buffered in the RB of the node i and deletes the second data packet buffered in the RB of the node i;

repeat reception rule:

for each t≥0, given that the node i has transmitted the data packet successfully to the node i−1 (resp. i+1), in the timeslot $3t+(i \bmod 3)$ but does not receive any data packet from a latter in the timeslot $3t+(j \bmod 3)+2$ (resp. $3t+(j \bmod 3)+1$), then the node i tries to receive the data packet transmitted by the node i−1 (resp. i+1) in the timeslots $3(t+1)+(i \bmod 3)+2$ (resp. $3(t+1)+(i \bmod 3)+1$), $3(t+2)+(i \bmod 3)+2$ (resp. $3(t+2)+(i \bmod 3)+1$), . . . , until the node i receives the data packet successfully from the node i−1 (resp. i+1);

in the time period from the timeslot $3(t+1)+(i \bmod 3)$ (resp. $3t+(i \bmod 3)+2$) to the timeslot when the node i successfully receives the data packet transmitted by the node i−1 (resp. node i+1), the node i performs the XOR operation on a data packet transmitted by the node i+1 (resp. node i−1) with the first data packet buffered in the RB of the node i and updates the first data packet in the RB of the node i with the XOR result, but stops transmitting packets temporarily.

* * * * *